Jan. 27, 1970  P. G. BEIMERS  3,491,908
SCREW CLOSURE FOR A CONTAINER OF THERMOPLASTIC MATERIAL
Filed Oct. 9, 1967
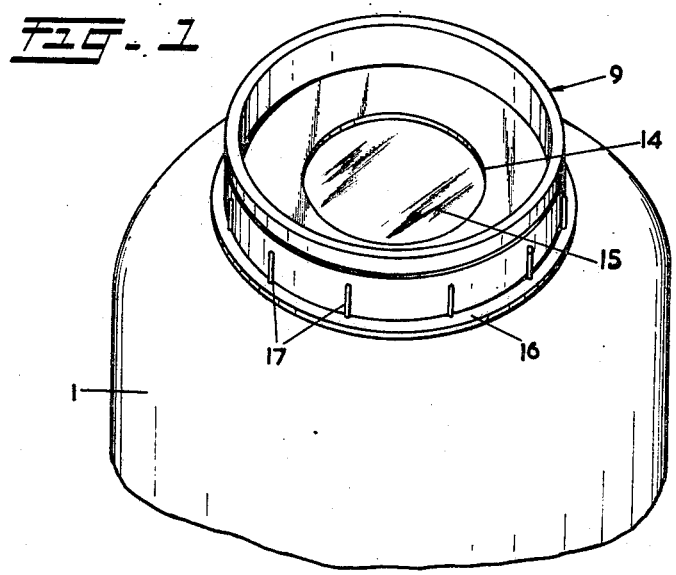
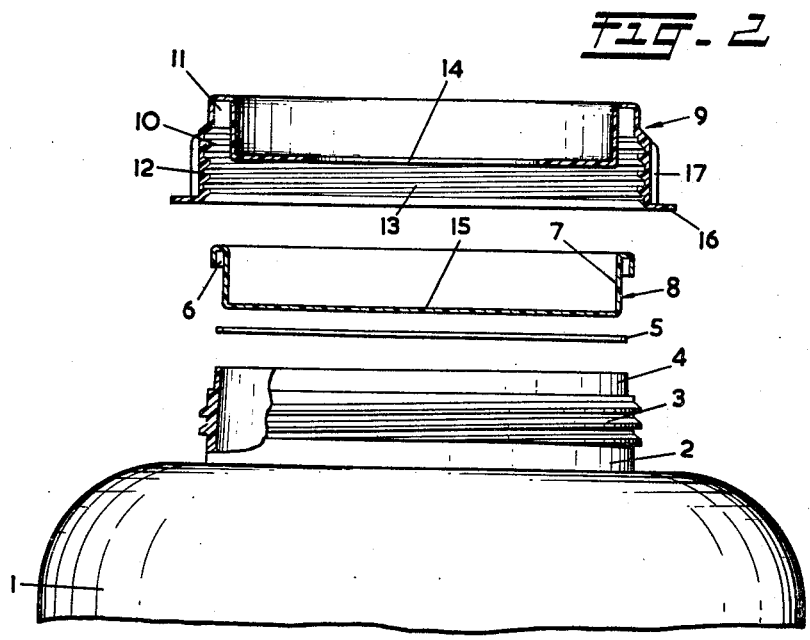
INVENTOR.
Pieter Gerben Beimers
BY

United States Patent Office 3,491,908
Patented Jan. 27, 1970

3,491,908
SCREW CLOSURE FOR A CONTAINER OF
THERMOPLASTIC MATERIAL
Pieter Gerben Beimers, Bornsestraat 358,
Almelo, Netherlands
Filed Oct. 9, 1967, Ser. No. 673,849
Claims priority, application Netherlands, Oct. 12, 1966,
6614350
Int. Cl. B65d 45/30
U.S. Cl. 215—97                           2 Claims

ABSTRACT OF THE DISCLOSURE

A screw closure for large thermoplastic containers, which comprises a deep screw cover and a deep intermediate cover, both of them being provided at their tops with U-shaped downwardly open annular grooves to slip over the annular groove of the intermediate cover and over the smooth portion of the neck of the container, respectively. The screw cover has a central opening and the intermediate cover is made of softer thermoplastic material than are the container and the screw cover for it to be highly flexible and to absorb splashing of the liquid in the container, especially in its central portion.

---

The present invention relates to a screw closure for a thermoplastic container of at least 10 litres capacity, and an externally threaded container neck having a large opening relative to the diameter of the container, said closure comprising a screw cover and an intermediate cover with a sealing ring. It is a disadvantage of such large containers, which, for economical reasons and because they must be resistant to chemical influences, consists of deformable polyethylene, that the sealing of the screw closure with a large circumference is not reliable enough. Particularly, leakage may occur during transport, when the contents of the container may produce large mass forces. Furthermore, at high temperatures, the plastic material may not seal well owing to its great flexibility. It also occurs that the sealing ring is not properly fitted between the covers and the neck.

It is an object of this invention to obviate these drawbacks.

According to the present invention the deep thermoplastic intermediate cover is provided at its rim with a downwardly open annular groove, U-shaped in cross-section, in which the flexible sealing ring is accommodated, and which slips over the smooth portion of the neck of the container above the external screw thread, and the likewise deep thermoplastic screw cover has at its top a downwardly open annular groove, U-shaped in cross section, which slips over the annular groove of the intermediate cover.

This structure has resulted in a high shape resistance of the screw closure. The sealing ring cannot be pressed in a bad fit and is not materially subjected to friction when the screw cover is screwed onto the neck, so that said ring, in spite of its being soft and flexible, cannot be deformed circumferentially and cannot become thicker locally owing to upsetting.

Also, it is a characteristic feature of this invention that the screw cover has an opening in its centre, which enables a sheet of instructions to be inserted between the screw cover and the intermediate cover. Particularly it is an advantage in this construction that the intermediate cover is made of softer thermoplastic material than are the container and the screw cover, so that in the case of shocks during transport the splashing of the liquid in the container is readily absorbed by the undulation then occurring in the central portion of the intermediate cover. Also, as a result of the flexibility of the intermediate cover, the provision of this cover, which accurately fits in the neck of the container, is appreciably facilitated, because the concave undulation caused by a force exerted centrally, reduces the circumference of the central portion.

Finally, it is an advantage of this structure of the screw closure that it can be readily seized during transportation of the container.

In illustartion of this invention, one embodiment will now be described, by way of example, with reference to the accompanying drawings, in which:

FIG. 1 is a perspective elevation of the upper portion of the container with the screw closure; and FIG. 2 is a side elevation, partly in section, with the various parts of the screw closure being shown individually.

Referring to the drawings, the container 1 has at its filling and pouring opening the normal neck 2, the lower portion of which is provided with an external thread 3, and the upper smooth portion 4 of which has an outer diameter smaller than the inner diameter of the thread 3. Unlike the embodiment shown, this thread may also have been formed in a blowing process.

The deep intermediate cover 8 has at its rim a downwardly open annular groove 6, U-shaped in cross-section, in which the sealing ring 5 is accomodated, and which slips over the smooth portion 4 of the neck of the container in the closed state of the screw closure. The closure is mounted by means of the likewise deep screw cover 9, which has at its top a downwardly open annular groove 10, U-shaped in cross-section, its body 12 being provided with the conventional internal thread 13. When the screw cover is screwed onto the external thread 3 of the neck 2 of the container, the bottom portion 11 of the annular groove 10 slips over the rim of the intermediate cover 8.

As on the one hand the annular groove 6 embraces the upper portion 4 of the neck 2 and on the other hand the annular groove 10 of the screw cover 9 embraces the rim of the intermediate cover, a strengthened and hence highly reliable seal is realized and a proper fit of the sealing ring 5 ensured, which is not peripherally upset when the screw cover is screwed down.

Besides, the screw cover 9 is provided with a central opening 14, a strengthening flange 16 and abutments 17.

What I claim is:

1. A screw closure of flexible small thickness cross section throughout for a thermoplastic container of at least 10 litres capacity, provided with a mouth opening and a neck around said opening, which has a large diameter relative to the diameter of said container, said neck comprising a screw thread portion with external screw thread and a smooth end portion extending above said screw thread portion, said closure comprising a thermoplastic screw cover with internal screw thread fitting in said external screw thread, a thermoplastic intermediate cover and an elastically flexible sealing ring, said intermediate cover having a peripheral portion which is U-shaped in cross section and forms a downwardly open groove adapted to slip fittingly over said smooth end portion of said neck, said screw cover having a peripheral portion which is also U-shaped in cross section complementary correspondingly to that of said intermediate cover and forms a downwardly open groove, adapted to slip fittingly over substantial length of said peripheral portion of said intermediate cover, and provided with said internal screw thread on the radially outer wall of said open groove, said elastically flexible sealing ring being located in said groove of the peripheral portion of the intermediate cover on and above the top face of said end portion only.

2. A screw closure as claimed in claim 1, wherein said screw cover has a large central opening and wherein said intermediate cover is made of material which is softer than the material of said container and said screw cover, said intermediate cover having a smaller U-shaped portion in contact with said U-shaped cross section of said peripheral portion of said screw cover provided thereby with extra support at weakest transition of flexible small thickness of said screw closure.

References Cited

UNITED STATES PATENTS

| | | | |
|---|---|---|---|
| 2,008,593 | 7/1935 | Pedersen | 215—97 |
| 2,941,689 | 6/1960 | Black | 220—23 |

GEORGE T. HALL, Primary Examiner

U.S. Cl. X.R.

150—.5; 215—43